United States Patent
Bates et al.

(10) Patent No.: US 6,766,495 B1
(45) Date of Patent: Jul. 20, 2004

(54) APPARATUS AND METHOD FOR IMPROVING LINE-TO-LINE WORD POSITIONING OF TEXT FOR EASIER READING

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/406,188

(22) Filed: Sep. 27, 1999

(51) Int. Cl.[7] .............................................. G06F 15/00
(52) U.S. Cl. ...................................... 715/531; 715/530
(58) Field of Search ............................... 715/530, 539, 715/531

(56) References Cited

U.S. PATENT DOCUMENTS

| | | | | |
|---|---|---|---|---|
| 3,991,405 A | * | 11/1976 | Boyd et al. ................. | 707/519 |
| 4,397,572 A | * | 8/1983 | Barnes et al. ................ | 400/3 |
| 4,587,631 A | * | 5/1986 | Nielsen et al. .............. | 707/524 |
| 5,592,574 A | * | 1/1997 | Chilton et al. .............. | 382/295 |
| 5,724,498 A | * | 3/1998 | Nussbaum .................. | 345/471 |
| 5,978,819 A | * | 11/1999 | Berstis ....................... | 707/513 |
| 6,223,191 B1 | * | 4/2001 | Truelson ..................... | 715/517 |
| 6,230,170 B1 | * | 5/2001 | Zellweger et al. .......... | 715/512 |
| 6,279,017 B1 | * | 8/2001 | Walker ....................... | 707/529 |

OTHER PUBLICATIONS

Grammatik grammar checker by Lernout & Hauspie Speech Products, N.V. 1998 (herein Grammatik).*

* cited by examiner

*Primary Examiner*—Stephen S. Hong
*Assistant Examiner*—Adam Queler
(74) *Attorney, Agent, or Firm*—Martin & Associates, LLC; Derek P. Martin

(57) ABSTRACT

An apparatus and method improve the readability of text on a computer system by changing the positioning of one or more words to eliminate potential problems in readability that can be identified by examining the text. When a potential problem is identified, the word to word positioning of text may be adjusted to compress one or more lines and/or to expand one or more lines to move one or more words to a different line. For example, if two adjacent lines begin with the same word, the first line could be compressed so the first word of the second line is moved to the end of the first line. In the alternative, the first line could be expanded so the last word of the first line is moved to the first word of the second line. By selectively changing the positioning of words, the readability of the text may be greatly improved.

27 Claims, 15 Drawing Sheets

| | Readibility Problems |
|---|---|
| 1 | If line (current line +1) is removed, does the resulting sentence make sense grammatically? |
| 2 | (1 and 2 same word) and (3 and 4 same word) |
| 3 | (3 and 4 same word) |
| 4 | (1 and 2 same word) |
| 5 | (1 and 2 same part of speech) and (3 and 4 same part of speech) |
| 6 | (3 and 4 same part of speech) |
| 7 | (1 and 2 same part of speech) |
| 8 | 1 is end of a clause and 2 is end of a clause |

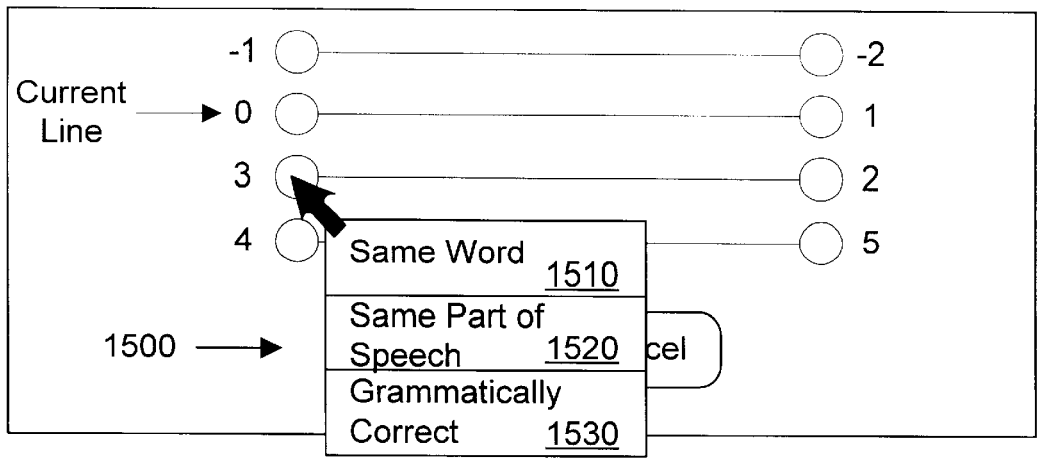

FIG. 15

```
•
•
•
   selector mechanism, to specify which mouse is active: In our primary
   model, a radial switch is rotated to identify the port number to which
   the desired mouse is connected. In our second model, a blue and red
10 ▶ button is provided next to each port, and the mechanism so that only one
12 ▶ button can be activated. The mouse switch contains an electronic micro
   chip to effect the switch. Multi-media applications will proliferate the use
   of mouse/trackball interfaces. In the future there will be many more
   styles of mice/trackballs to address the different multi-media interfaces.
•
•
•
```

FIG. 16

```
•
•
•
   selector mechanism, to specify which mouse is active: In our primary
   model, a radial switch is rotated to identify the port number to which
   the desired mouse is connected. In our second model, a blue and red
14 ▶ button is provided next to each port, and the mechanism so that only
16 ▶ one button can be activated. The mouse switch contains an electronic
   micro chip to effect the switch. Multi-media applications will proliferate
   the use of mouse/trackball interfaces. In the future there will be many
   more styles of mice/trackballs to address the different multi-media
•
•
•
```

FIG. 17

```
•
•
•
```
After assembling your tools and laying out the parts provided, begin assembling the unit by attaching shelf B to back panel D. Line up holes B1 and D1. Insert bolt P1 and with a hammer hit the bolt till the threads are through. Use your hand to twist the nut N1 onto the bolt, but do not yet tighted the bolt with a wrench. With one bolt firmly but not tightly secured, insert second
```
•
•
•
```

(with arrows labeled 18, 20, 22 pointing to lines)

FIG. 18

```
•
•
•
```
After assembling your tools and laying out the parts provided, begin assembling the unit by attaching shelf B to back panel D. Line up holes B1 and D1. Insert bolt P1 and with a hammer hit the bolt till the threads are through. Use your hand to twist the nut N1 onto the bolt, but do not yet tighted the bolt with a wrench. With one bolt firmly but not tightly secured, insert
```
•
•
•
```

(with arrows labeled 24, 26)

FIG. 19

```
•
•
•
```
After assembling your tools and laying out the parts provided, begin assembling the unit by attaching shelf B to back panel D. Line up holes B1 and D1. Insert bolt P1 and with a hammer hit the bolt till the threads are through. Use your hand to twist the nut N1 onto the bolt, but do not yet tighted the bolt with a wrench. With one bolt firmly but not tightly secured, insert second bolt
```
•
•
•
```

(with arrow labeled 28)

30 ▶  ANS/ISO is always the first consideration. In general, the ANS/ISO documentation is very precise and complete (but defines very few functions). Our spec only gives a one line description of the functions and does not describe the details, so it is not much help. The SQL Server documentation is better, but still incomplete and, in some cases, the documentation simply does not match what they implemented.
32 ▶  Experimentation was necessary to figure out what they actually did.
34 ▶  We have not experimented with every function to determine the results. The Software Licensing Committee discussed a subset of these last year

36 ▶  ANS/ISO is always the first consideration. In general, the ANS/ISO documentation is very precise and complete (but defines very few functions). Our spec only gives a one line description of the functions and does not describe the details, so it is not much help. The SQL Server documentation is better, but still incomplete and, in some cases, the documentation simply does not match what they
38 ▶  implemented. Experimentation was necessary to figure out what they actually did. We have not experimented with every function to determine the results. The Software Licensing Committee discussed a

APPARATUS AND METHOD FOR IMPROVING LINE-TO-LINE WORD POSITIONING OF TEXT FOR EASIER READING

BACKGROUND OF THE INVENTION

1. Technical Field

The present invention relates in general to the data processing field. More specifically, the present invention relates to the arrangement of text by a software application.

2. Background Art

Computer systems are often used to display text to a user on a computer display or to output text to a printer. When reading an article with a lot of text, there is sometimes a tendency for the reader's eye to go to the wrong line when moving from one line to the next. For example, instead of picking up on the next line, the reader may instead pick up on the line just read, and then get momentarily confused until the reader realizes the mistake. The reader must then go back and start the sentence over again to regain the train of thought, trying carefully to go to the correct line the next time. Sometimes, in going from one line to the next, the reader may pick up one line too far down, missing a line. Depending on the grammar flow, the reader may not detect the mistake, causing the reader to miss some potentially important information.

Most modern software applications that manipulate text, such as word processors and web browsers, have an automatic word wrap feature that breaks a line of text along word boundaries when a margin is encountered, and may include many features such as font size, margins, spacing between letters, etc. that control how text appears to a user. However, these features address the physical arrangement of the text without regard to which words are present in the text and their positions relative to each other. The readability of text on a computer display or printout is affected by the relative positions of words in the text. For example, if two adjacent lines of text begin with the same word, the user might be inclined to skip a line when reading the text, or at least to pause to assure he or she is reading the proper line. Even if the words are different, if two adjacent lines of text begin with the same part of speech, the text will probably be readable if a line is skipped, making the text harder to read. The prior art applications have no way of changing the line position of words to make the text more readable based on defined readability problems that may exist in the text. Without an apparatus and method for changing word positions to improve readability of text, software applications will continue to arrange text without regard to potential readability problems, and users will thus continue to have problems reading computer-generated text when readability problems exist in the text.

DISCLOSURE OF INVENTION

An apparatus and method improve the readability of text on a computer system by changing the positioning of one or more words to eliminate potential problems in readability that can be identified by examining the text. When a potential problem is identified, the word to word positioning of text may be adjusted to compress one or more lines and/or to expand one or more lines to move one or more words to a different line. For example, if two adjacent lines begin with the same word, the first line could be compressed so the first word of the second line is moved to the end of the first line. In the alternative, the first line could be expanded so the last word of the first line is moved to the first word of the second line. By selectively changing the positioning of words, the readability of the text may be greatly improved.

The foregoing and other features and advantages of the invention will be apparent from the following more particular description of preferred embodiments of the invention, as illustrated in the accompanying drawings.

BRIEF DESCRIPTION OF DRAWINGS

FIG. 15 is a display diagram showing a user interface dialog box that allows a user to define a parameter for a word at a particular line position in the dialog box of FIG. 14;

FIG. 16 is a display illustrating one particular reading problem;

FIG. 17 is a display that resolves the reading problem in FIG. 16;

FIG. 18 is a display illustrating one particular reading problem;

FIG. 19 is a display that improves the reading problem in FIG. 18;

FIG. 20 is a display that resolves the reading problem in FIG. 18;

FIG. 21 is a display illustrating one particular reading problem; and

FIG. 22 is a display that improves the reading problem in FIG. 21.

BEST MODE FOR CARRYING OUT THE INVENTION

According to preferred embodiments of the present invention, an apparatus and method selectively change the line-to-line word positioning of text to improve readability of the text. The present invention applies to any arrangement of text, whether displayed to a user on a display device, printed in hard-copy form, or any other arrangement of text known in the art or developed in the future.

Figure 1:
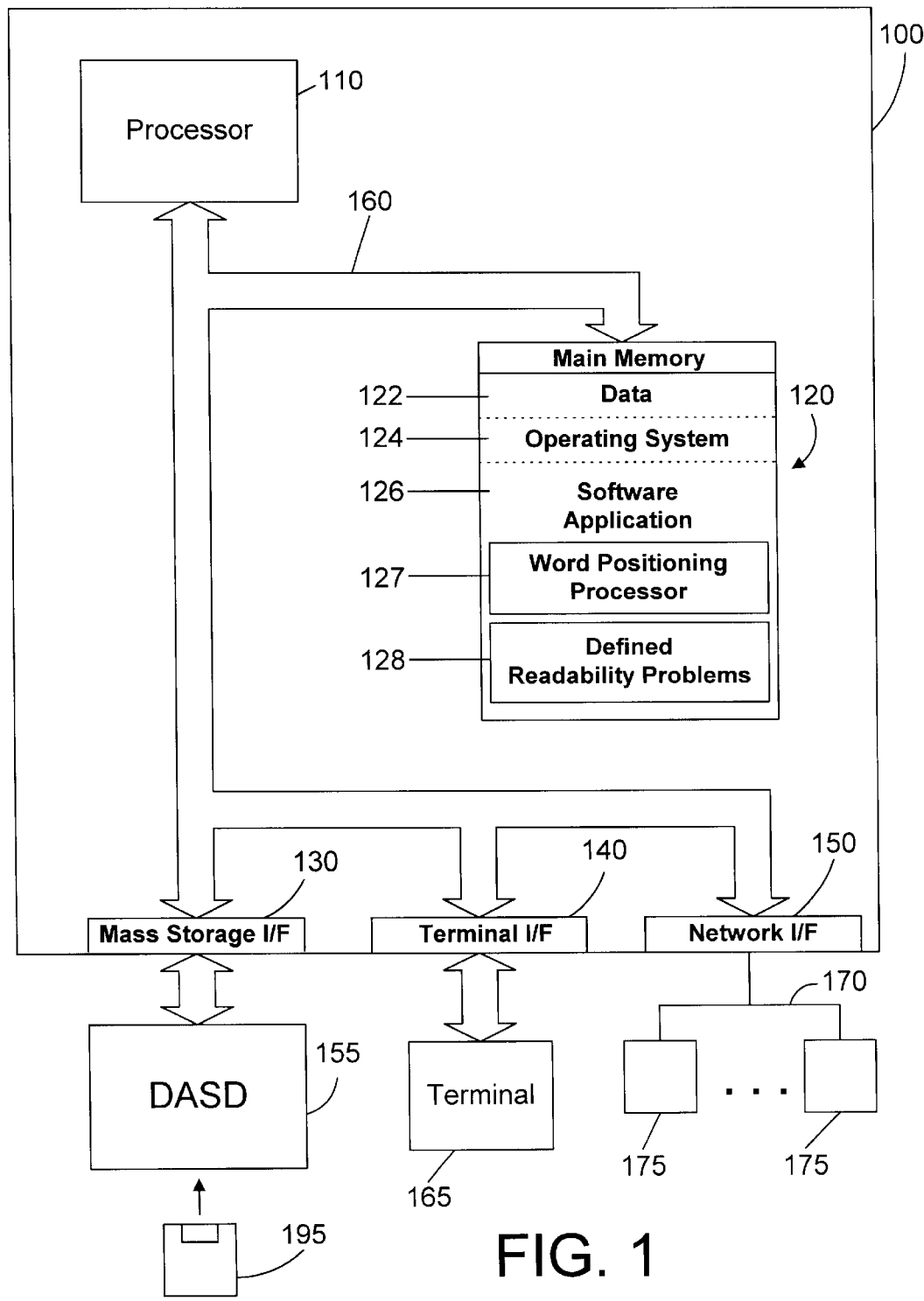
FIG. 1 is a block diagram of a computer apparatus in accordance with preferred embodiments of the present invention.

Referring to FIG. 1, a computer system 100 in accordance with the preferred embodiments is an enhanced IBM AS/400 computer system. However, those skilled in the art will appreciate that the mechanisms and apparatus of the present invention apply equally to any computer system, regardless of whether the computer system is a complicated multi-user computing apparatus. a single user workstation, or an embedded control system. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 122, an operating system 124, and a software application 126 that contains a word positioning processor 127 that functions in accordance with a set of defined readability problems 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and software application 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Software application 126 is any software that arranges text. Examples include word processors, web browsers, spreadsheets, etc.

Word positioning processor 127 analyzes text arranged by software application 126, determines whether any of the defined readability problems 128 are present in the text, and selectively changes the position of one or more words in the text to alter the line-to-line positioning of words to make the text more readable. Examples of defined readability problems 128 are provided in FIG. 6, some of which are discussed in more detail below with reference to FIGS. 16–22.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165,.because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
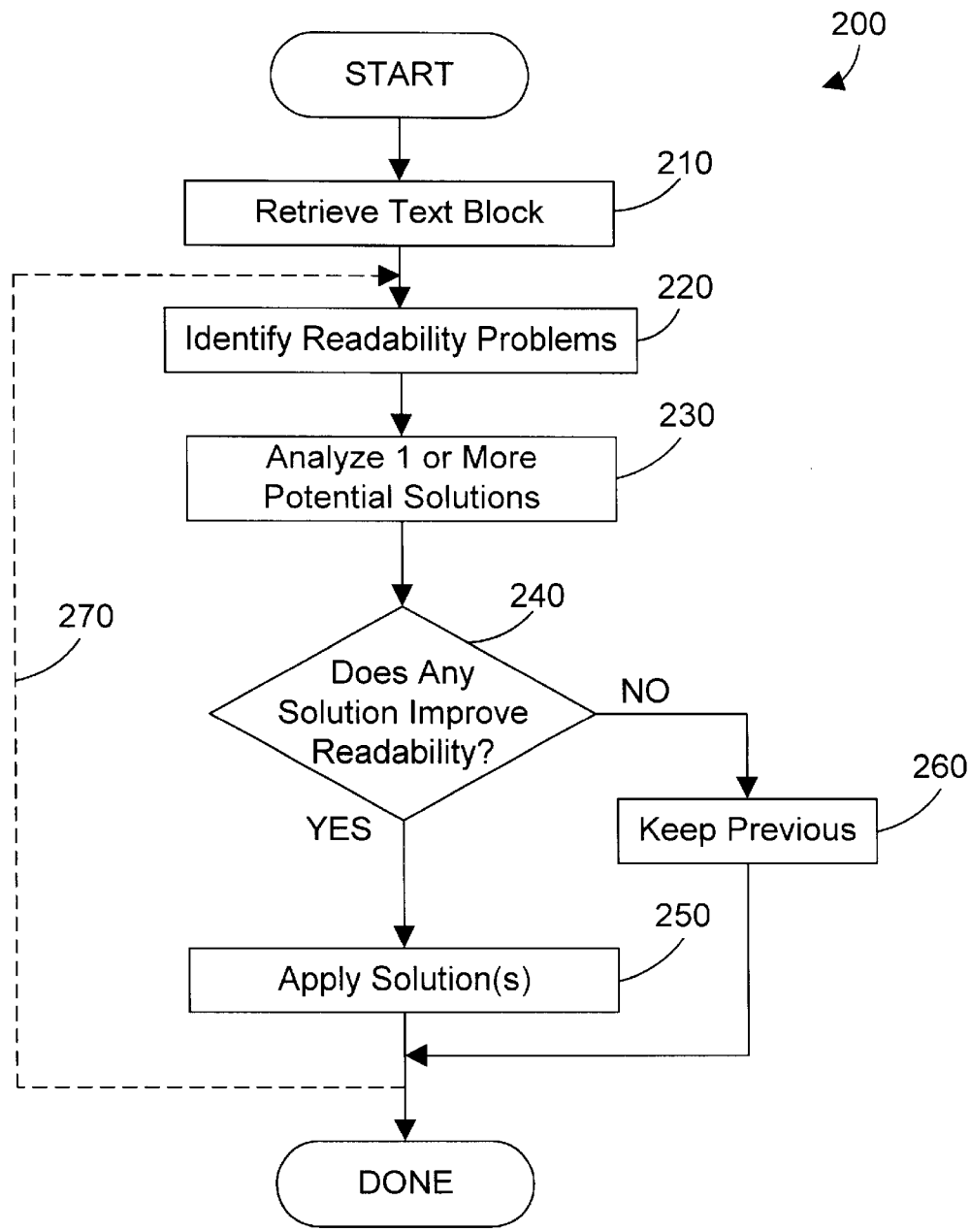
FIG. 2 is a flow diagram showing the steps in a method for improving the readability of text in accordance with the preferred embodiments.

Referring to FIG. 2, a method 200 illustrates steps that could be taken by word positioning processor 127 of FIG. 1 in accordance with the preferred embodiments. Method 200 begins by retrieving a block of text (step 210). Next, the text is analyzed to determine if any defined readability problems (e.g., 128 in FIG. 1) are present in the text (step 220). Once any readability problems are determined, one or more potential solutions are analyzed (step 230) to determine whether any of the solutions improves readability (step 240). If a solution does not improve the readability of the text (step 240=NO), the previous version is kept (step 260), and none of the solutions are applied to the text. If one or more solutions improves the readability of the text (step 240=

YES), these are applied to the text (step 250) to rearrange the line-to-line word positioning of one or more words. Note that this process can iterate, as shown by the dotted line 270, to further process the text block (or other portions of the text block) as required. In the iterative case, the keep previous block (step 260) would keep the latest version, which previously may have had solutions applied. Once method 200 has made all the required or desired improvements to readability, method 200 is done.

Method 200 as shown in FIG. 2 shows the high level function of the word positioning processor 127 of FIG. 1 in accordance with the preferred embodiments. This method, in concept, is relatively simple. If a readability problem exists in the text, a line is either compressed enough to make space for the first word of the following line, or is expanded enough to push the last word to the following line. The revised text can then be checked for readability problems again, because moving a word to a different line can affect the words that begin and end many or all of the lines in the same paragraph that follow the change. This process can iterate until a best solution is derived and applied to the text. While the general concepts are relatively simple, implementing the word positioning processor 127 requires consideration of numerous details. One specific implementation now is described in reference to FIGS. 3–12.

Figure 3:
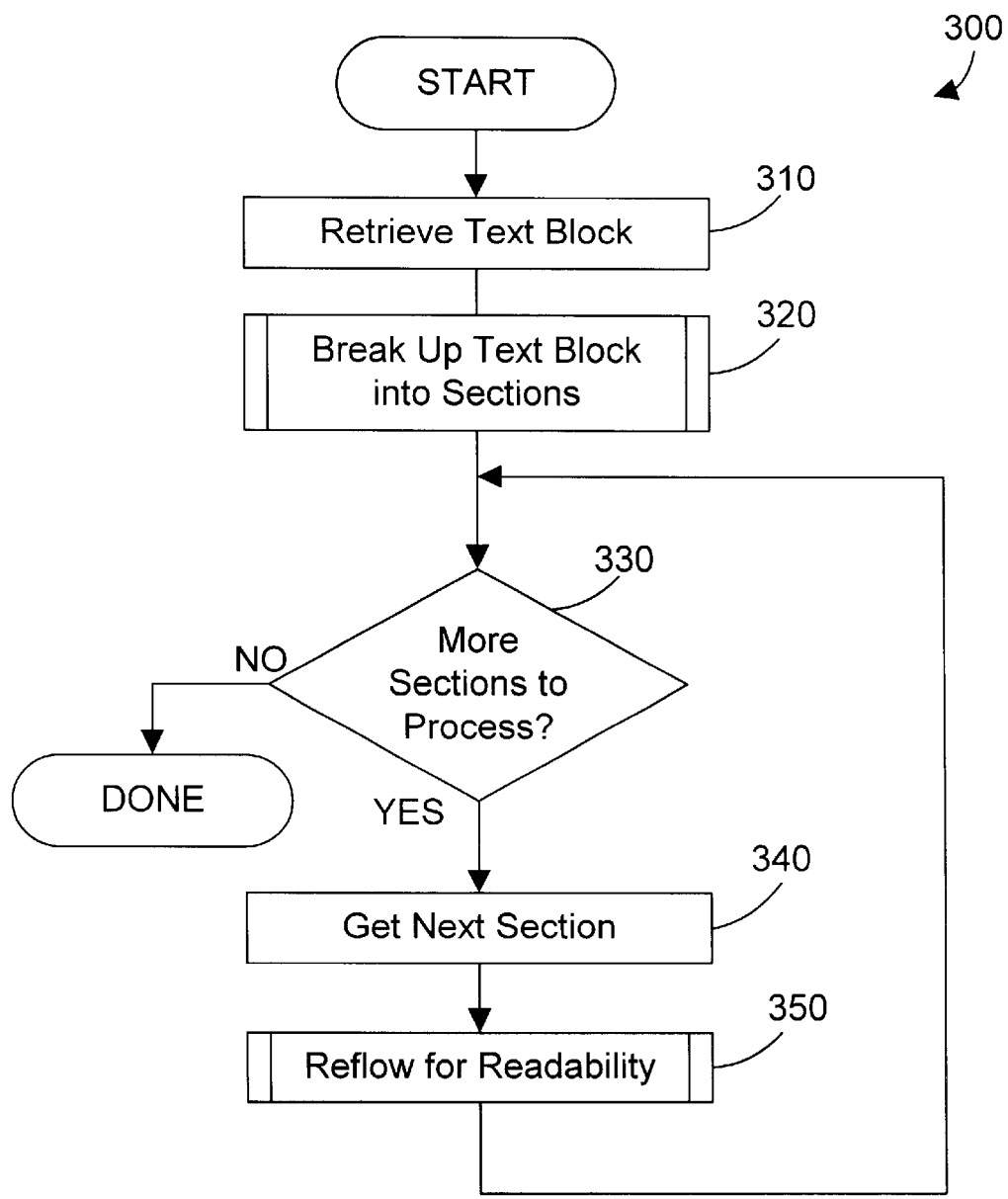
FIG. 3 is a flow diagram of a method for processing sections of text for readability.

Referring to FIG. 3, a method 300 for one specific implementation in accordance with the preferred embodiments begins by retrieving a text block (step 310). Next, the text block is broken up into sections for processing (step 320), and these blocks are then processed one at a time. The details of step 320 are described below with reference to the flow diagram of FIG. 4. Block 330 tests to see if there are more blocks to process. Of course, if the text block was just broken into sections in step 320, there will be one or more sections to process (step 330=YES). Method 300 then gets the next section of text (step 340), and reflows the text for readability (step 350). This "reflow for readability" step 350 is where the text is analyzed, and the line-to-line position of one or more words may be changed to improve readability if any readability problems are present in the text section being processed. Details of the "reflow for readability" step 350 are described below with reference to the flow diagram of FIG. 7. Method 300 then loops back to see if there are more sections to process (step 330). If so (step 330=YES), method 300 continues with steps 340 and 350. Once there are no more sections to process (step 330=NO), method 300 is done.

Figure 4:
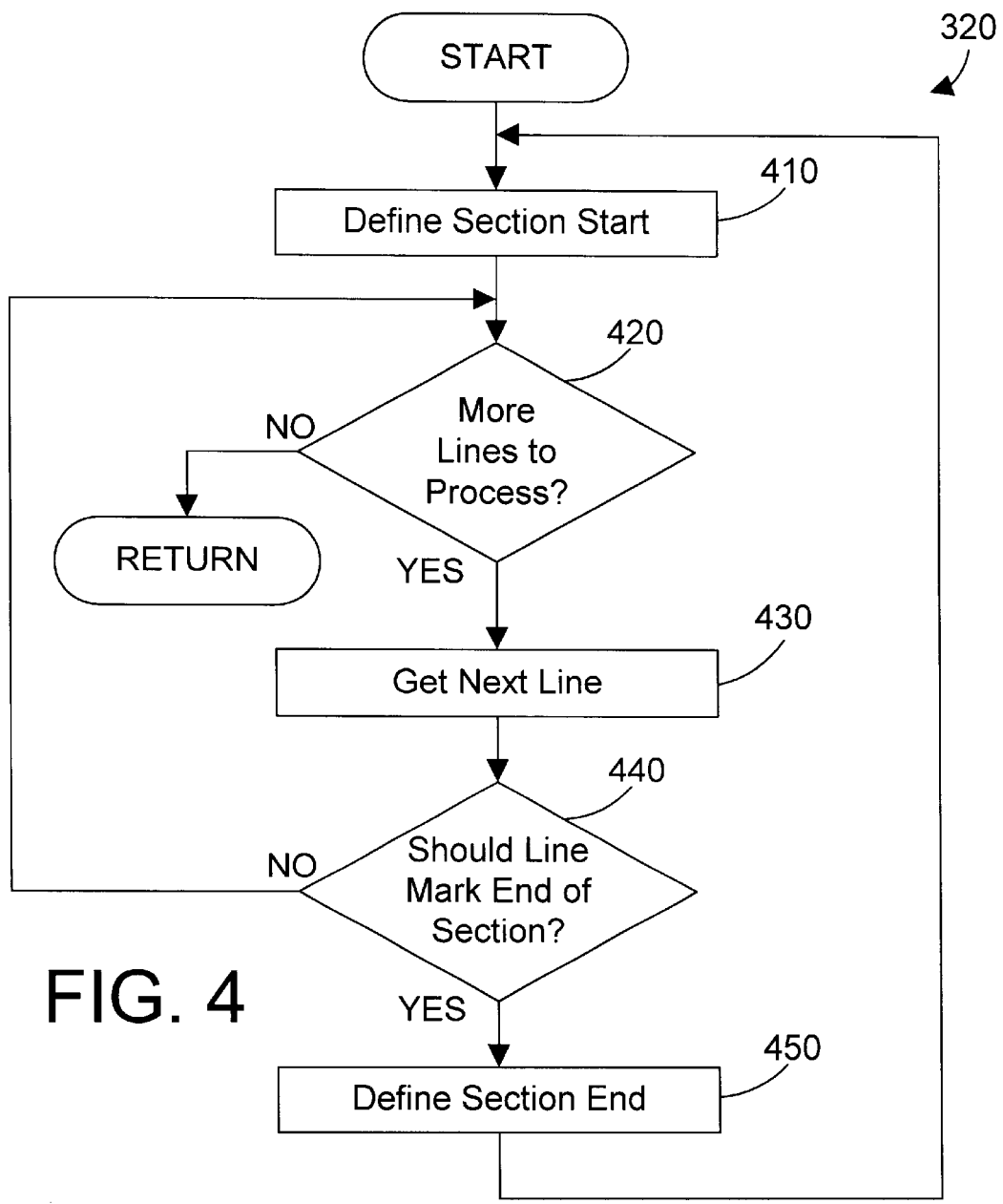
FIG. 4 is a flow diagram of a method for breaking text into sections in step 320 of FIG.3.

FIG. 4 shows the steps of a method 320 in accordance with the preferred embodiments for performing step 320 of FIG. 3. First, a "start of section" is defined in the text (step 410). For the first time through, the "start of section" will be placed at the beginning of the text block. Next, step 420 determines if there are more lines to process (step 420). The first time through, there will be more lines to process (step 420=YES), so the next line is retrieved (step 430), and a determination is made whether or not to terminate the section at that line (step 440). For example, if the current line is the last line in a paragraph, the section should end with that line. If the current line is already distinguished from the following line (for example, by a page break, a different font, a different color, or other breaks in flow), the current line should end the section. If the current line should not mark the end of the section, (step 440=NO), control is passed back to step 420 to process more lines, if any. If the current line should be the last line in a section (step 440=YES), an "end of section" is defined in the text (step 450), and step 320 loops back and continues at step 410 until there are no more lines to process (step 420=NO) and step 320 returns and passes control to step 330 in FIG. 3. Once control has passed from step 320 to step 330 in FIG. 3, we know that the text block is now divided up into sections.

Figures 5, 6:
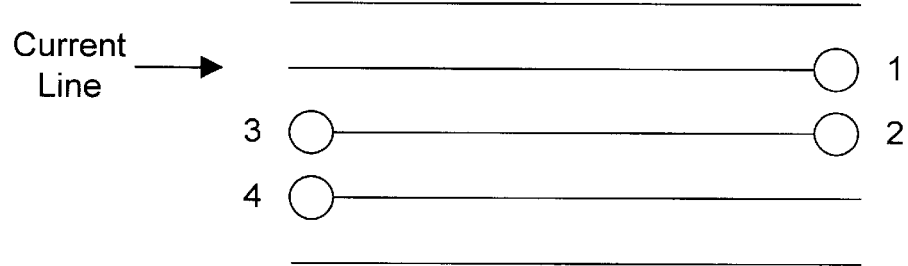
FIG. 5 is a graphical display representing lines of text with predefined word positions.
FIG. 6 is a table showing a predefined readability problems in reference to the diagram of FIG. 5.

Each text section is then processed for readability problems. FIGS. 5 and 6 illustrate eight known readability problems. FIG. 5 represents lines of text, and the circles and corresponding numerical labels identify words that begin or end a line of text. These numbers are used in defining the readability problems in FIG. 6. Problem 1 occurs when a sentence or combination of sentences that has a line removed makes sense grammatically. In this case, it would be very easy for a reader to skip a line because of the grammatical flow. Problem 2 results when the current line and the next line both end with the same word, AND (current line+1) and (current line+2) begin with the same word. This creates a serious problem that makes it hard for a reader to discern which line comes next. Problem 3 results when two lines begin with the same word. Problem 4 results when two lines end with the same word. Problem 5 results when the last word for the current line and the last word of (current line+1) are the same parts of speech, AND when the first word of (current line+1) and the first word of (current line+2) are the same part of speech. Problem 6 results when the first word of (current line+1) and the first word of (current line+2) are the same part of speech. Problem 7 results when the last word for the current line and the last word of (current line+1) are the same parts of speech. Problem 8 results when the end of two adjacent lines both end a clause with a punctuation mark, such as a period, question mark, colon, semicolon, dashes, etc. All of these problems are known readability problems that could cause a reader to skip a line or become confused while reading. These readability problems are shown by way of example, and there are many other possible readability problems not listed in FIG. 6. The scope of the preferred embodiments expressly extends to adjusting the line-to-line position of one or more words in a text section to improve any and all readability problems that may be presently defined or developed in the future.

Figure 7:
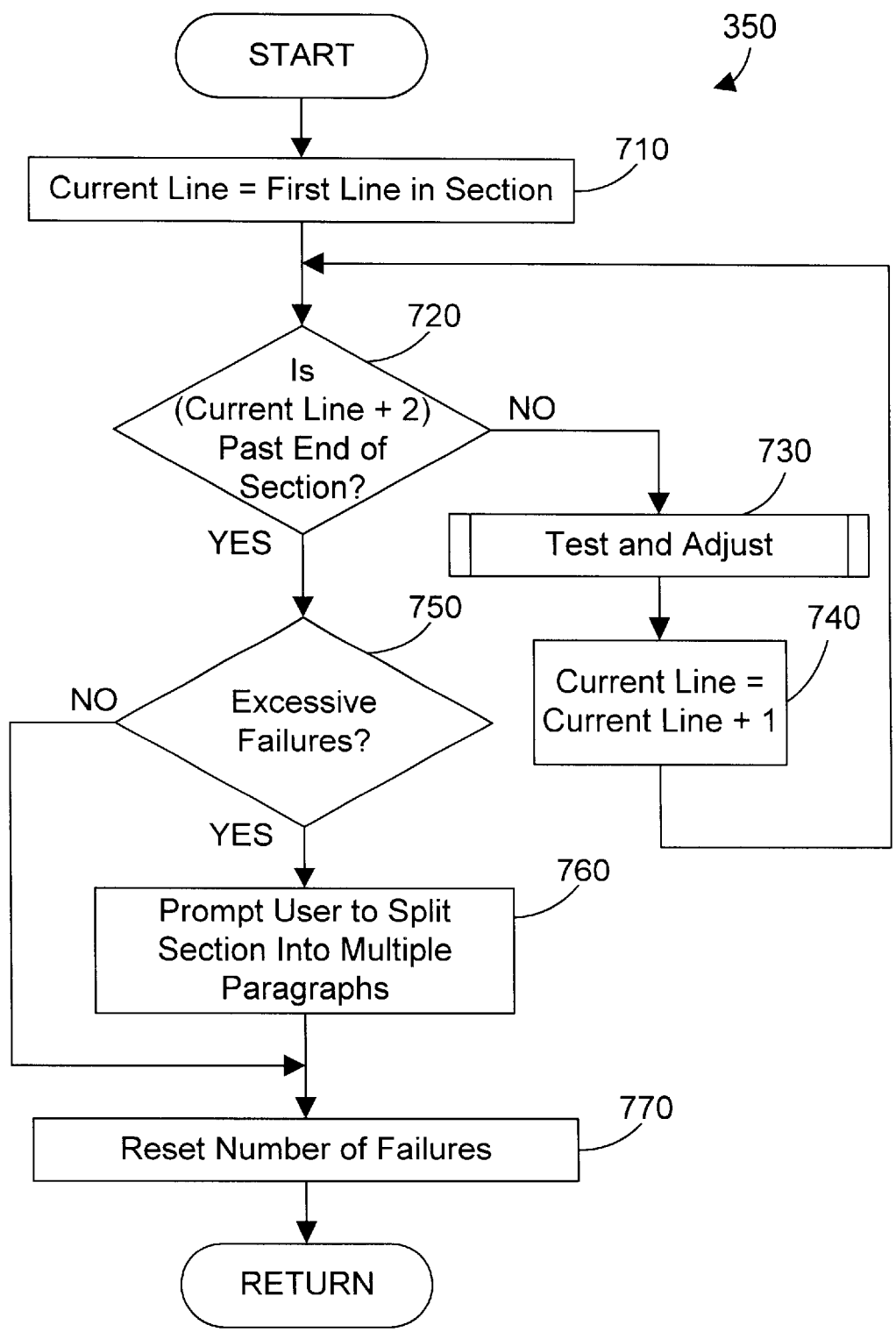
FIG. 7 is a flow diagram of a method for processing a text section for readability in step 350 of FIG. 3.

FIG. 7 shows the steps of a method 350 in accordance with the preferred embodiments for performing step 350 of FIG. 3, which analyzes the text and applies potential solutions to improve the readability of the text. The first line in the section is initially set to be the current line (step 710). Next, the text section is analyzed to determine whether two lines past the current line extends beyond the end of the text section being processed (step 720). If so (step 720=YES), we know that all of the adjustments to the text have been made and tested. At this point we determine whether excessive failures have been logged during the process of trying different solutions to the readability problems (step 750). If the problems for the current text section are excessive (step 750=YES), and if the user can control text attributes, method 350 prompts the user to split the section into multiple sections using paragraph breaks, font changes, images, different colors, or any other suitable way to provide a break in the section (step 760). If the number of failures is not excessive (step 750=NO), the number of failures is reset (step 770), and method 350 returns.

If two lines past the current line is still in the current section being processed (step 720=NO), the section is tested and adjusted (step 730) in an attempt to solve one or more readability problems in the text section. The details of step 730 are discussed in more detail below in reference to FIG. 8. Once the test and adjust step 730 is complete for the first few lines of the text section, the current line is then assigned to the next line (step 740), and processing continues. This process continues until each line is considered, making adjustments as required for each line in the text section being processed.

Figure 8:
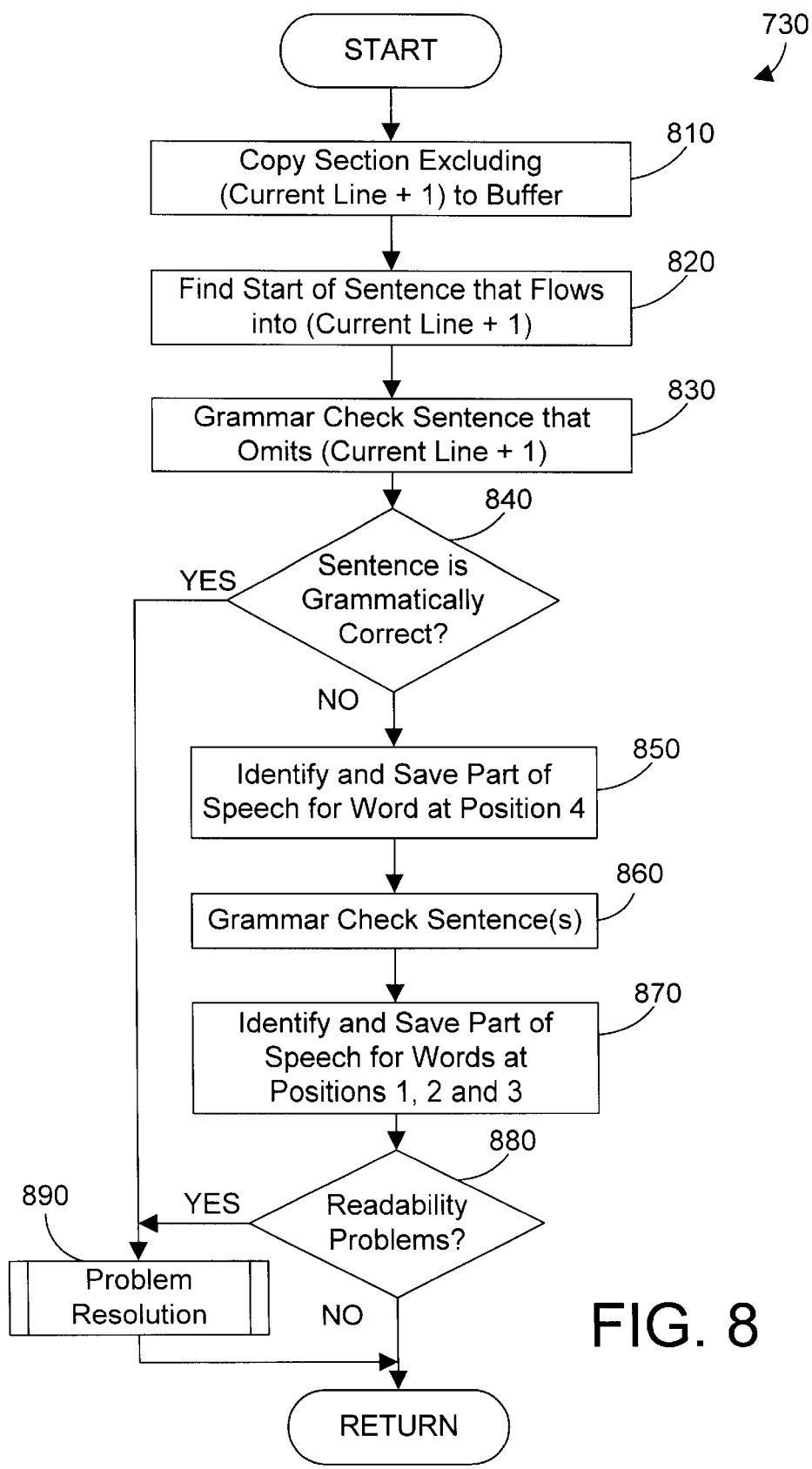
FIG. 8 is a flow diagram of a method for testing and adjusting lines of text in a text section to determine whether the lines of text have readability problems.

FIG. 8 shows the steps of a method 730 in accordance with the preferred embodiments for performing step 730 of FIG. 7, which analyzes the text, makes adjustments, and tests the adjustments to see if they result in improved readability. First, the text section is copied to a buffer, except that the line (current line+1) is excluded or omitted (step 810). Next, the beginning of the sentence that flows into the beginning of the (current line+1) is located (step 820), and the grammar of that sentence appended to (current line+2) is checked (with the (current line+1) omitted) (step 830). If the sentence that has a line missing still makes sense grammatically (step 840=YES), this means that Problem 1 is present, and this problem needs to be resolved in the problem resolution phase (step 890). If the sentence is not grammatically correct (step 840=NO), this means that Problem 1 is not present. Next, method 730 checks for the other problems, but before doing that it must determine the parts of speech for the words at the positions shown in FIG. 5. First, the part of speech for the word at position 4 may be saved from the grammar check in step 830 (step 850). Next, the sentence that flows into the current line, and any other sentence or sentences that have any portions on the current line, (current line+1), or (current line+2) are grammar checked (step 860). Note that this grammar check 860 includes the current line, while the grammar check in step 830 excluded the current line. The grammar checker determines the part of speech for the words in the text, and the parts of speech are saved for the words at positions 1, 2 and 3 in FIG. 5. With the parts of speech now determined for each of the four positions 1, 2, 3, and 4 in FIG. 5, step 880 determines whether any of the readability problems exist in the current line, (current line+1), and (current line+2). In the preferred embodiments, step 880 determines whether any of problems 2–8 are present in these three lines of text. If no (step 880=NO), method 730 returns without making any adjustments to the text. If one or more of the readability problems in FIG. 6 exist (step 880=YES), the highest weighted readability problem is passed to the problem resolution step 890, which then attempts to improve the readability of the text section.

Note that the grammar checking performed in steps 830 and 860 in FIG. 8 are preferably performed using known grammar checking mechanisms. Examples of suitable grammar checkers that could be used in steps 830 and 860 include Grammatik, Grammar Slammer (for IBM PCs and compatibles) and Grammarian (for McIntosh).

Figure 9:
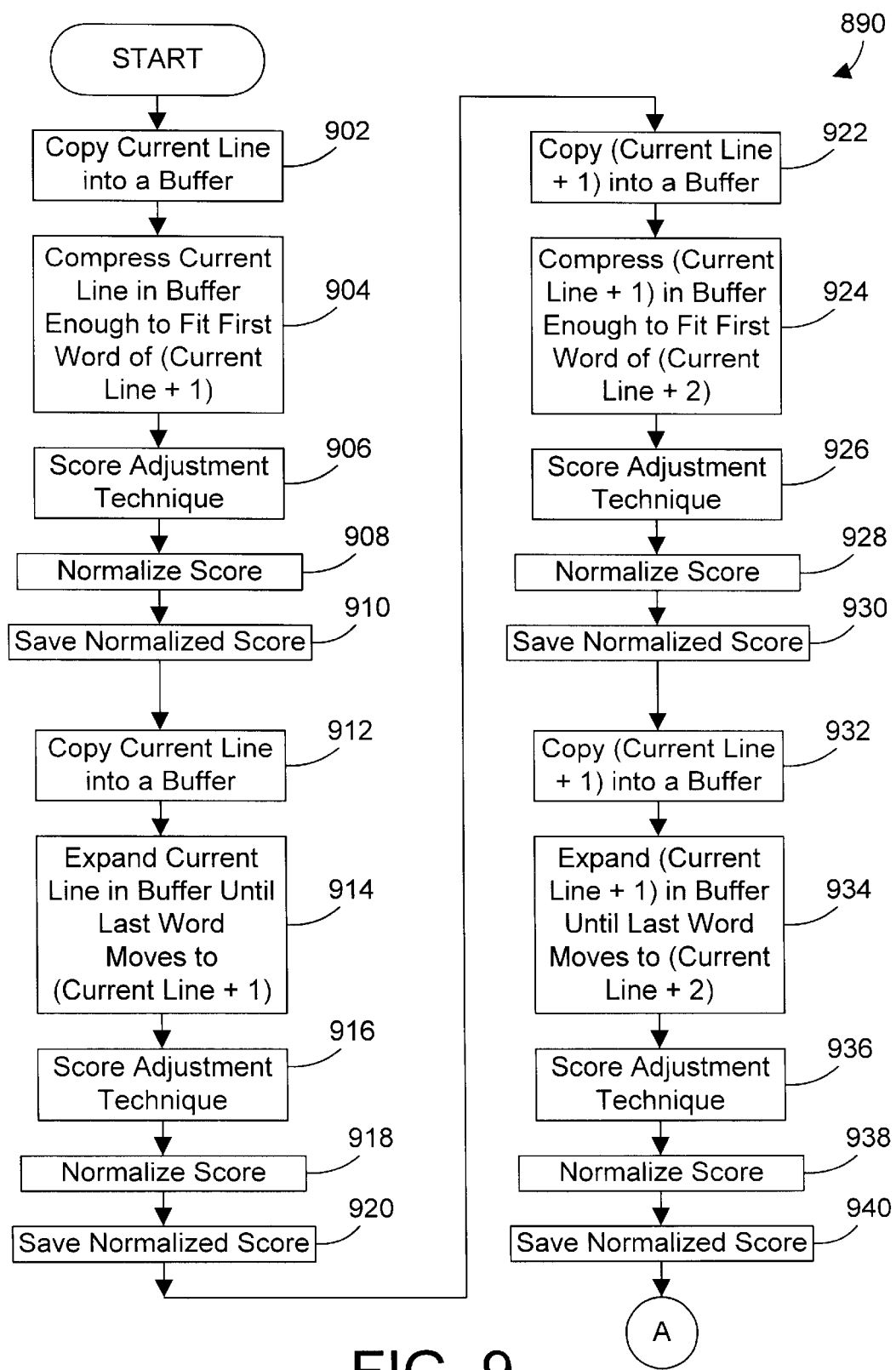
FIG. 9 is a flow diagram of a method for trying to resolve defined readability problems using four different word adjustment techniques in accordance with the preferred embodiments and scoring each word adjustment technique based on the readability of the text after applying each word adjustment technique.

FIG. 9 shows the steps of a method 890 in accordance with the preferred embodiments for performing step 890 of FIG. 8. Method 890 is based on the assertion that a readability problem in the three lines that include the current line, (current line+1), and (current line+2) as shown in FIG. 5 may be solved in one of four adjustment techniques. First, the current line can be compressed enough for the word at position 3 to move up to the end of the current line. Second, the current line can be expanded until the word at position 1 of the current line is pushed to the beginning of (current line+1). Third, (current line+1) can be compressed so that the word at position 4 is moved to position 2. Fourth, (current line+1) can be expanded so the word at position 2 is moved to position 4. Any of these four adjustment techniques can be used so solve a readability problem, or combinations of these can be used as well. Note, however, that the first and third technique relate to compressing different lines, and the second and fourth techniques relate to expanding different lines. Thus, the four techniques recited above can really be condensed into two general techniques: 1) compress a line to move the first word of the following line to the end of the line; and 2) expand a line to move the last word of the line to the following line.

Referring now to method 890 in FIG. 9, step 902 begins by copying the current line into a buffer (step 902). Next, the current line is compressed in the buffer until the first word of the (current line+1) can be moved to the last word of the current line (step 904). Next, this adjustment technique is scored (step 906). In the preferred embodiments, the score of the adjustment technique depends on the number of spaces that must be compressed out of a line or added to a line to move a word. For example, for the adjustment technique in step 904, its score depends on the number of spaces compressed out of the current line until the first word of the (current line+1) will fit. The score is then normalized so it can be compared with the other adjustment techniques (step 908). For example, expanding a line of text to add spaces does not affect the looks of the text as much as compressing it by the same number of spaces. We assume for the purpose of illustration that we can expand a line twice as many spaces as we can compress, and the normalized score will be the same. In this example, step 908 would assure that the score of this compression adjustment technique is comparable to the score of an expansion technique by either multiplying the score of the compression technique by two, or dividing the score of expansion techniques by two. This normalization allows the scores to be directly compared. The normalized score for the first proposed adjustment technique is then saved (step 910).

Note that there may be thresholds that are set to determine whether or not an adjustment technique should be considered at all. For example, if a compression requires compressing more than eight spaces, the compression could return a very high score (or a representation of infinity) so that the compression adjustment technique will not be selected. Likewise, if an expansion requires expanding more than sixteen spaces, the expansion would also return a very high (or infinite) score. Note also that it may be impossible to compress a line if the number of available spaces is less than the threshold.

Once the first adjustment technique has been considered, the next adjustment technique is analyzed. The current line is copied into a buffer again (step 912). The current line is then expanded until the last word in the current line moves to the first word of (current line+1) (step 914). The adjustment technique is then scored (step 916), the score is normalized (step 918) and the normalized score is saved (step 920), similar to steps 906, 908 and 910 discussed above. The current line is then copied into a buffer again (step 922). The (current line+1) is then compressed until the first word of the next line (current line+2) moves to the last word of (current line+1) (step 924). This adjustment technique is then scored (step 926), the score is normalized (step 928) and the normalized score is saved (step 930), similar to the steps already described. The current line is then copied into a buffer again (step 932), and the (current line+1) is expanded until the last word of the (current line+1) moves to the first word of the (current line+2) (step 934). The adjustment technique is then scored (step 936), the score is normalized (step 938), and the normalized score is saved (step 940). Method 890 then continues on FIG. 10.

Once all the normalized scores are stored for each different possible adjustment technique to each possible problem, these adjusted scores are compared to the weight of the readability problem that is trying to be solved (step 1010). If all normalized scores exceed the weight of the problem (step 1010=YES), method 890 returns, and was unable to improve the readability of the three lines beginning at the current line. If one or more normalized scores are less than the weight of the problem (step 1010=NO), the adjustment technique with the best normalized score is retrieved (step 1020). Next, step 1030 determines whether the text with the adjustment technique applied is better or worse than without the adjustment technique applied (step 1030). The details of step 1030 are discussed below with reference to the method 1030 of FIG. 11. If the text with the adjustment technique is no better (step 1040=NO), method 890 returns without making any changes to the three lines beginning at the current line. If the text with the adjustment technique is better (i.e., more readable) (step 1040=YES), the adjustment technique with the best normalized score is applied to the text (step 1050), and the resulting test is then reflowed for readability (step 350). Because one change in line-to-line word spacing can change the beginning and ending words of lines in the rest of the paragraph, the change must be reflowed to step 350 to determine whether any readability problems have arisen due to the adjustment technique that was applied. Once method 890 returns from step 350, it gives control back to method 730, which then returns to step 740 in FIG. 7.

In FIG. 9, steps 904 and 924 compress a line of text to make room for another word, while steps 914 and 934 expand a line of text to push a word onto the next line. These steps depend on the automatic word wrap feature that is present on almost all know software applications that arrange text. These steps further depend on a mechanism that allows the adjustment of text attributes that will allow a line of text to be compressed or expanded. An example of one such mechanism is a feature that allows for adjusting the spacing between letters. Most modern word processors, such as Lotus Ami Pro, Microsoft Word, and Corel WordPerfect, include commands that allow fine-tuning text attributes, such as spacing between letters, justification of text, font sizes, etc. Any suitable attribute of a text line can be adjusted in any way to compress or expand a line of text within the scope of the preferred embodiments, whether that way is currently known or developed in the future. The present invention expressly extends to any and all ways of expanding and compressing lines of text to move line-to-line positions of words.

Figure 10:
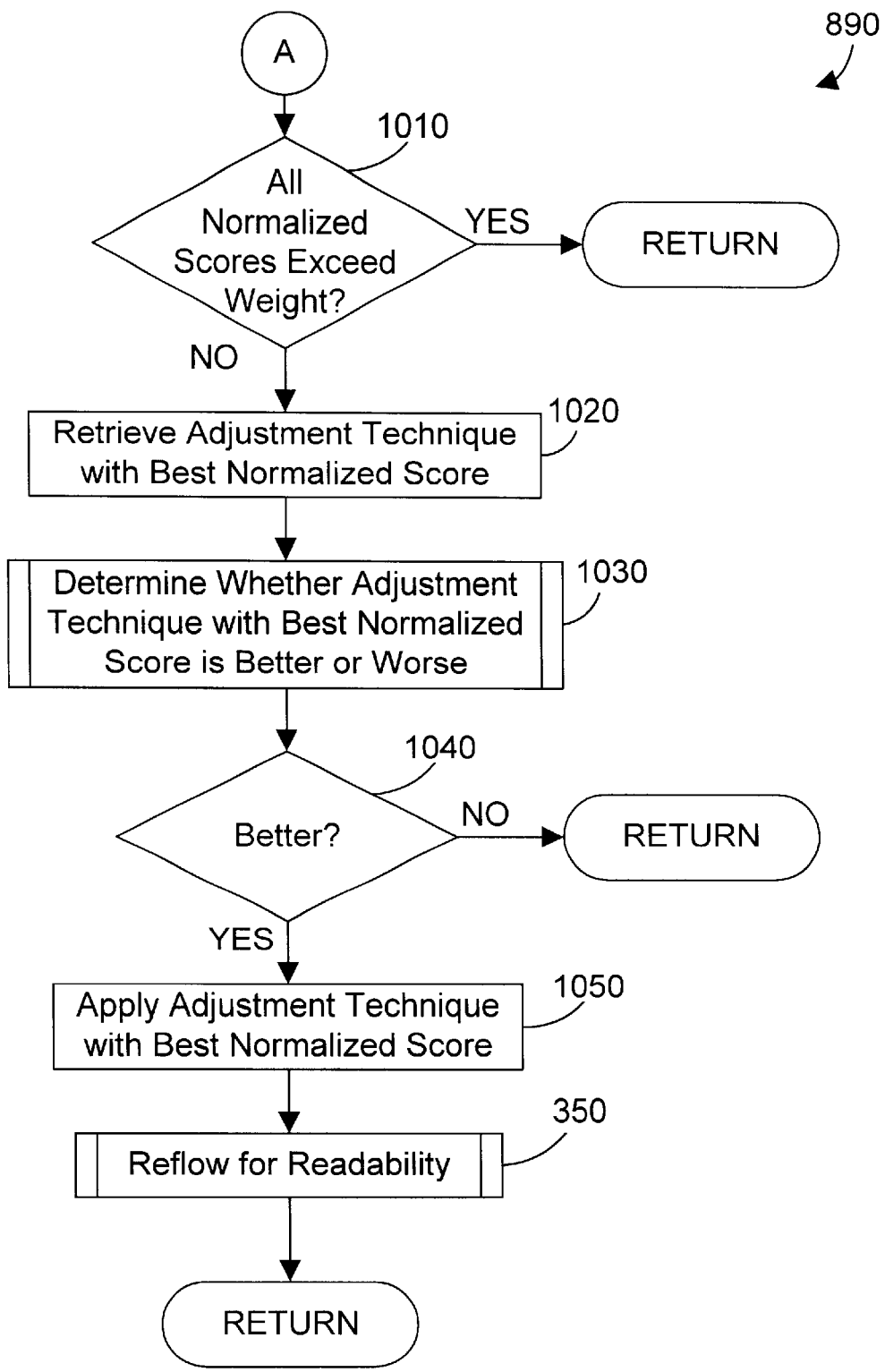
FIG. 10 is a flow diagram of the steps for determining whether to apply any of the fixes from the four techniques in FIG. 9.
Figure 11:
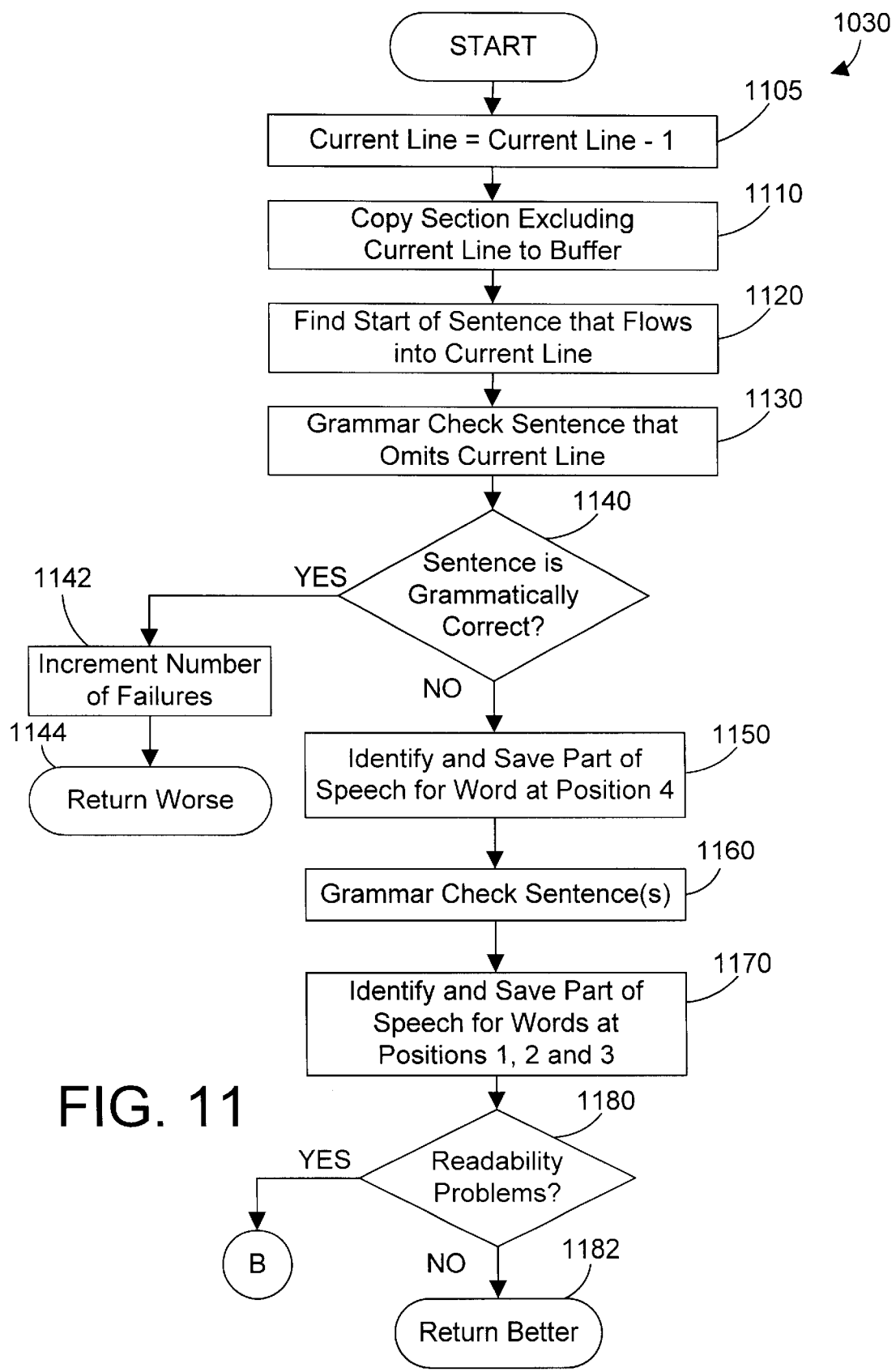
FIGS. 11 and 12 each comprise portions of a flow diagram of a method for determining whether any solution provides better readability.
Figure 12:
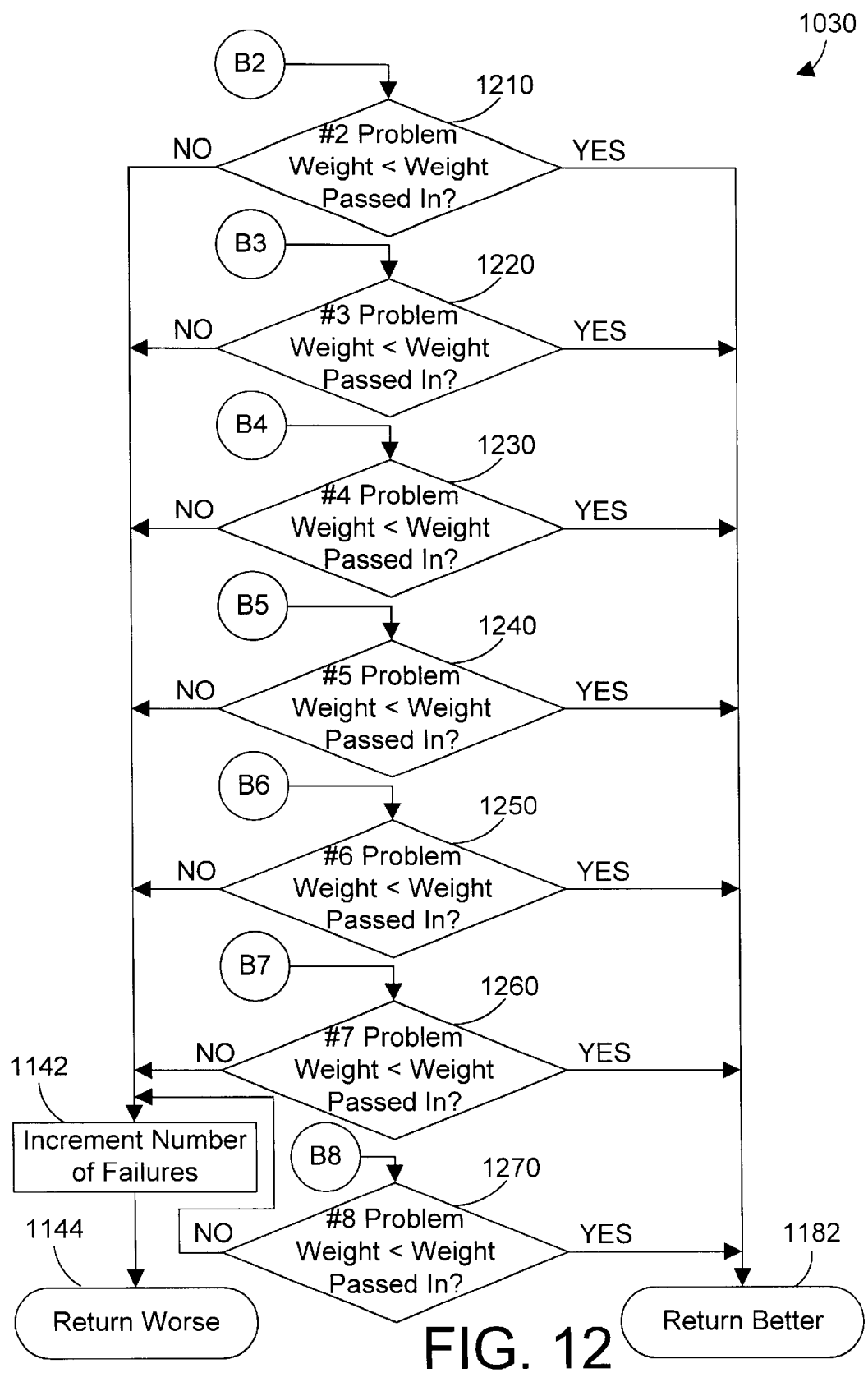

FIG. 11 shows the steps of a method 1030 in accordance with the preferred embodiments for performing step 1030 of FIG. 10, which determines whether the adjustment technique with the best adjusted score is better or worse than the text before the adjustment technique. First, the current line is assigned to (current line−1) (step 1105) to back up one line and determine the effect of the adjustment on the text. Note that if there is no (current line−1), the steps in FIG. 11 are performed for the current line. Steps 1110, 1120, and 1130, and 1140 are the same as steps 810, 820, and 830, and 840 in FIG. 8, which are described above. The primary difference is that method 1030 in FIG. 11 is operating on the next line up, meaning that the current line in method 1030 is the line just preceding the current line in method 730 of FIG. 8. If the sentence without the current line is grammatically correct (step 1140=YES), the number of failures is incremented (step 1142), and method 1030 returns WORSE (step 1144) to indicate that the effect of the adjustment made the text less readable than before. If the sentence is not grammatically correct (step 1140=NO), the part of speech at position 4 is saved (step 1150), the text (including the current line) is then grammar checked (step 1160), and the parts of speech for the words at positions 1, 2, and 3 are identified and saved (step 1170). At this point step 1180 determines whether there are any readability problems in the text (step 1180). If not (step 1180=NO), the adjustment made the text more readable, and method 1030 returns BETTER (step 1182). If there are still readability problems (step 1180=NO), method 1030 continues in FIG. 12. Note that point B in FIG. 11 flows to one or more of entry points B2–B8 in FIG. 12, depending on which readability problem exists in the adjusted text. Each of steps 1210, 1220, 1230, 1240, 1250, 1260, and 1270 determine whether the weight of the problem that now exists in the adjusted text is less than the weight of the problem that existed before the adjustment, which is a weight that is passed in to method 1030. If a new readability problem in the adjusted text is as bad or worse (i.e., of equal or greater weight) than the one that the adjustment was trying to solve (one of steps 1210–1270= NO), the number of failures is incremented (step 1142), and method 1030 returns WORSE (step 1144). If a new readability problem in the adjusted text is of lower weight than the problem that existed before the adjustment (steps 1210–1270=YES), the adjusted text is better, and method 1030 returns BETTER (step 1182). Note that in selecting the appropriate entry point for point B in FIG. 12, if multiple problems exist in the adjusted text, only the highest weight problem is selected, so that a lower weight problem cannot return a BETTER when a weightier problem is present.

Figure 13:
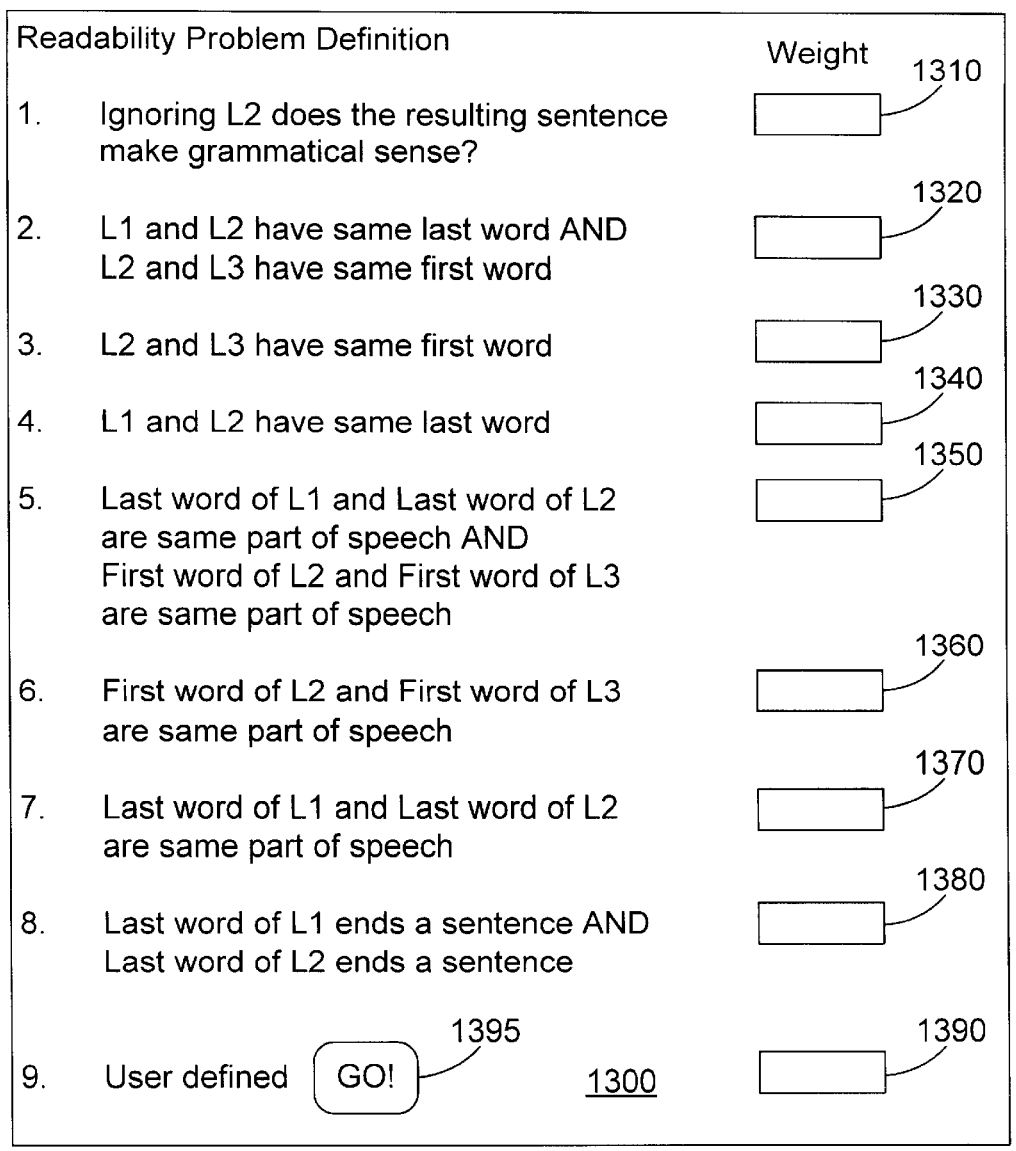
FIG. 13 is a display diagram showing a user interface dialog box that allows a user to weight the eight problems defined in the preferred embodiments, and that also allow a user to define additional problems.

In the preferred embodiments, the weights of each readability problem are preferably defaulted to system settings that are derived from readability studies. However, these defaults can be overridden by the user. Referring to FIG. 13, a user interface dialog box 1300 lists the predefined problems 1–8 listed in FIG. 6. Note that the problems listed in FIG. 13 are in terms of Line 1 (L1), which corresponds to the current line; Line 2 (L2) which corresponds to (current line+1); and Line 3 (L3) which corresponds to (current line+2). Dialog box 1300 has data entry fields 1310–1380 that correspond to each of the listed problems. The user may thus enter a weight for each problem, which will govern the way that word positioning processor 127 adjusts the text for readability. In the preferred embodiments, default values are set to correspond to the numerical rank of the problem, where Problem 1 is a higher rank than the other problems, and so on in descending order. The numerical values can then be overridden by the user to custom-define the way that word positioning processor 127 makes adjustments to text for readability.

Figure 14:
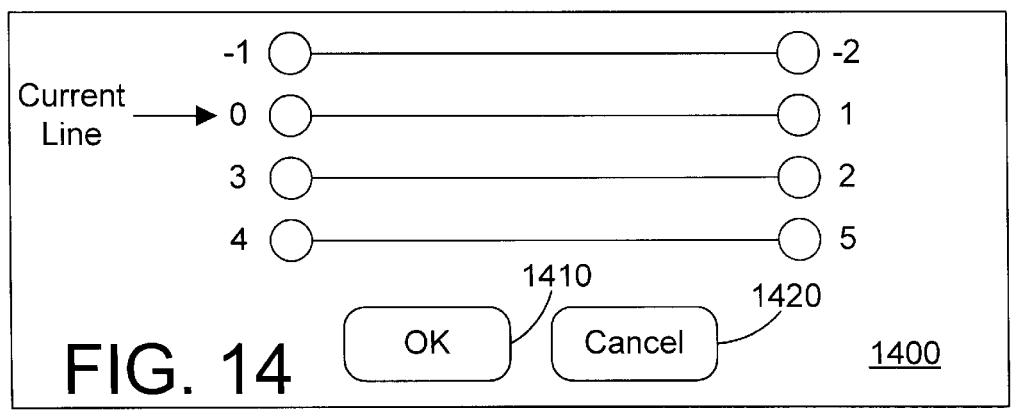
FIG. 14 is a display diagram showing a user-interface dialog box that allows a user to custom-define additional readability problems.

User interface dialog box 1300 of FIG. 13 also includes a "user defined" problem definition and a corresponding data entry field 1390 for weight. When a user clicks on the "GO" button 1395 next to the "User defined" text in the dialog box 1300, another dialog box 1400 appears as shown in FIG. 14. This dialog box includes a diagram that represents four lines of text with the numerical positions as shown in FIG. 5, in addition to having all other line ends labeled as well. The user can then define a custom readability problem. For example, if the user places a pointer on the #3 node as shown in FIG. 15 and right-clicks the pointer, another dialog box 1500 could give the user the option of defining a problem criteria for that node. Dialog box 1500 includes the menu selections "Same Word" 1510, "Same Part of Speech" 1520, and "Grammatically Correct" 1530. If the user selects the "Same Word" menu option for node #3, the user would then have to click on a second node to indicate the problem. For example, the user might decide to define another problem, when three lines all begin with the same word. The user could right-click on node #3 (as shown in FIG. 15) and select the "Same Word" menu selection 1510. The user could then click on node #0 and node #-1 to group these nodes with node #3 in the "Same Word" criteria. This grouping would be visually indicated using color, boxes, or any other suitable way for visually identifying the group. Once the user has defined a new readability problem, the user clicks on the OK button 1410, which returns the user to the dialog box 1300 in FIG. 13. If the user decides not to enter a user-defined readability problem, the user can click on the Cancel button 1420 in dialog box 1400 to cancel the definition of the problem and return to the dialog box 1300 of FIG. 13. In the preferred embodiments, word positioning processor 127 thus provides an editor of sorts for a user to define new readability problems that are not in the list in FIG. 6. Note, however, that once a user defines any readability problem, that problem also is a "defined readability problem" for the purposes of the discussion and claims herein.

Some examples of defined readability problems and possible solutions in accordance with the preferred embodiments are shown in FIGS. 16–22. Referring now to FIG. 16, this display is an illustration of problem 3 in FIG. 6, when two adjacent lines begin with the same word. The lines at 10 and 12 both commence with the word "button", making it very easy for a reader to skip a line or re-read a line when reading this arrangement of text. Referring to FIG. 17, the original arrangement of text can be made more readable by expanding the line at 14 so that the word "one" that was previously at the end of that line now appears at the beginning of the following line at 16. By moving the line-to-line-position of the word "one", the text is made more readable.

Another example of a defined readability problem is shown in FIG. 18, which shows an illustration of problem 3 in FIG. 6, when two adjacent lines begin with the same word. The lines at 20 and 22 both begin with "the". One adjustment technique for making the text more readable expands the text at 18 until the word "hit" is moved to the beginning of the following line, as shown in FIG. 19. However, this adjustment has created a different readability problem because two adjacent lines now begin with the same part of speech. The lines at 24 and 26 both begin with verbs that would make it relatively easy to skip a line when reading. This problem corresponds to problem 6 in FIG. 6. This new problem can be avoided by compressing the line at 18 in FIG. 18 until the "the" at the beginning of the following line moves to the end of the line at 18, as shown at 28 in FIG. 20. While the adjustment technique employed to produce the text arrangement of FIG. 19 succeeds at eliminating the two adjacent lines with the same work, it creates a new problem, which is avoided by using a different adjustment technique, as shown in FIG. 20. This example shows why iterating through several different adjustment techniques is necessary to provide text that is more readable than the original text arrangement.

A final example of a defined readability problem is shown in FIG. 21, which shows an illustration of problem 8 in FIG. 6, when two adjacent lines both end a sentence. In FIG. 21, lines 30, 32 and 34 all end with a period, which ends a sentence. The text of FIG. 21 may be adjusted to eliminate this problem by expanding the line at 30 in FIG. 21 until the word "implemented" is moved to the beginning of the following line, as shown by 36 and 38 in FIG. 22. This adjustment moves the end of the sentences so they are not at the end of adjacent lines, thus eliminating the readability problem that existed in the original text.

The preferred embodiments disclosed herein provide a way for a software application to automatically arrange text so the text is more readable to a user. This feature is especially useful in word processors and web browsers, but also has great value with a large number of other types of software as well. For example, the present invention could be implemented in a print driver that controls how text is arranged on a hard copy. The present invention expressly extends to any and all software that arrange text in any form whatever.

Note that the examples presented herein change the readability of text by moving words from one line to another. However, it is equally within the scope of the preferred embodiments to move word portions instead by appropriately splitting a word between lines using a hyphen. For example, in FIG. 21, the line at 30 could be expanded until the "mented" part of "implemented" is moved to the next line, and a hyphen could then be used to separate word portions "imple" and "mented". The preferred embodiments expressly extend to changing the line to line position of whole words and/or any portions of words to improve the readability of the text.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, problem 8 in FIG. 6 is defined to exist when two adjacent lines both end a sentence. However, other punctuation marks can also trigger readability problems. For example, if a line ends in a colon and the following line ends in a semicolon, this may also present another readability problem. In similar fashion, quotation marks and other punctuation marks can cause readability problems in some circumstances. As stated plainly herein, the present invention extends to changing the line position of one or more words to improve any readability problem, regardless of the actual definition of the problem.

We claim:

1. An apparatus comprising:
    at least one processor;
    a memory coupled to the at least one processor;
    a software application residing in the memory and executed by the at least one processor, the software application arranging a plurality of lines of text, each line comprising a plurality of words, wherein the software application includes:
    a word positioning processor that analyzes the words in at least two lines of text, determines whether at least one readability problem is present in the at least two lines of text, wherein the at least one readability problem includes two adjacent lines that begin with the same word, wherein the word positioning processor changes the line position of at least one word portion in the text to improve the readability of the text by performing at least one of the following steps:
        (A) compressing a first line of text so the first word of the following line of text moves to the end of the first line of text;
        (B) expanding the first line of text so the last word of the first line of text moves to the beginning of the following line of text.

2. An apparatus comprising:
at least one processor;
a memory coupled to the at least one processor;
a software application residing in the memory and executed by the at least one processor, the software application arranging a plurality of lines of text, each line comprising a plurality of words, wherein the software application includes:
  a word positioning processor that analyzes the words in at least two lines of text, determines whether at least one readability problem is present in the at least two lines of text, wherein the at least one readability problem includes two adjacent lines that end with the same word, wherein the word positioning processor changes the line position of at least one word portion in the text to improve the readability of the text by performing at least one of the following steps:
    (A) compressing a first line of text so the first word of the following line of text moves to the end of the first line of text;
    (B) expanding the first line of text so the last word of the first line of text moves to the beginning of the following line of text.

3. An apparatus comprising:
at least one processor:
a memory coupled to the at least one processor;
a software application residing in the memory and executed by the at least one processor, the software application arranging a plurality of lines of text, each line comprising a plurality of words, wherein the software application includes:
  a word positioning processor that analyzes the words in at least two lines of text, determines whether at least one readability problem is present in the at least two lines of text, wherein the at least one readability problem includes two adjacent lines that begin with the same part of speech, wherein the word positioning processor changes the line position of at least one word portion in the text to improve the readability of the text by performing at least one of the following steps:
    (A) compressing a first line of text so the first word of the following line of text moves to the end of the first line of text;
    (B) expanding the first line of text so the last word of the first line of text moves to the beginning of the following line of text.

4. An apparatus comprising:
at least one processor;
a memory coupled to the at least one processor;
a software application residing in the memory and executed by the at least one processor, the software application arranging a plurality of lines of text, each line comprising a plurality of words, wherein the software application includes:
  a word positioning processor that analyzes the words in at least two lines of text, determines whether at least one readability problem is present in the at least two lines of text, wherein the at least one readability problem includes two adjacent lines that end with the same part of speech, wherein the word positioning processor changes the line position of at least one word portion in the text to improve the readability of the text by performing at least one of the following steps:
    (A) compressing a first line of text so the first word of the following line of text moves to the end of the first line of text;
    (B) expanding the first line of text so the last word of the first line of text moves to the beginning of the following line of text.

5. An apparatus comprising:
at least one processor;
a memory coupled to the at least one processor;
a software application residing in the memory and executed by the at least one processor, the software application arranging a plurality of lines of text, each line comprising a plurality of words, wherein the software application includes:
  a word positioning processor that analyzes the words in at least two lines of text, determines whether at least one readability problem is present in the at least two lines of text, wherein the at least one readability problem includes two adjacent lines that each have a last word that ends a sentence, wherein the word positioning processor changes the line position of at least one word portion in the text to improve the readability of the text by performing at least one of the following steps:
    (A) compressing a first line of text so the first word of the following line of text moves to the end of the first line of text;
    (B) expanding the first line of text so the last word of the first line of text moves to the beginning of the following line of text.

6. A method for improving the readability of text comprising a plurality of words in a plurality of lines, the method comprising the steps of:
  analyzing the words in at least two lines of text;
  determining whether at least one readability problem is present in the at least two lines of text, wherein the at least one readability problem includes two adjacent lines that begin with the same word; and
  changing the line position of at least one word portion in the text to improve the readability of the text by performing at least one of the following steps:
    (A) compressing a first line of text so the first word of the following line of text moves to the end of the first line of text;
    (B) expanding the first line of text so the last word of the first line of text moves to the beginning of the following line of text.

7. A method for improving the readability of text comprising a plurality of words in a plurality of lines, the method comprising the steps of:
  analyzing the words in at least two lines of text;
  determining whether at least one readability problem is present in the at least two lines of text, wherein the at least one readability problem includes two adjacent lines that end with the same word; and
  changing the line position of at least one word portion in the text to improve the readability of the text by performing at least one of the following steps:
    (A) compressing a first line of text so the first word of the following line of text moves to the end of the first line of text;
    (B) expanding the first line of text so the last word of the first line of text moves to the beginning of the following line of text.

8. A method for improving the readability of text comprising a plurality of words in a plurality of lines, the method comprising the steps of:

analyzing the words in at least two lines of text;
determining whether at least one readability problem is present in the at least two lines of text, wherein the at least one readability problem includes two adjacent lines that begin with the same part of speech; and
changing the line position of at least one word portion in the text to improve the readability of the text by performing at least one of the following steps:
(A) compressing a first line of text so the first word of the following line of text moves to the end of the first line of text;
(B) expanding the first line of text so the last word of the first line of text moves to the beginning of the following line of text.

9. A method for improving the readability of text comprising a plurality of words in a plurality of lines, the method comprising the steps of:
analyzing the words in at least two lines of text;
determining whether at least one readability problem is present in the at least two lines of text, wherein the at least one readability problem includes two adjacent lines that end with the same part of speech; and
changing the line position of at least one word portion in the text to improve the readability of the text by performing at least one of the following steps:
(A) compressing a first line of text so the first word of the following line of text moves to the end of the first line of text;
(B) expanding the first line of text so the last word of the first line of text moves to the beginning of the following line of text.

10. A method for improving the readability of text comprising a plurality of words in a plurality of lines, the method comprising the steps of:
analyzing the words in at least two lines of text;
determining whether at least one readability problem is present in the at least two lines of text, wherein the at least one readability problem includes two adjacent lines that each have a last word that ends a sentence; and
changing the line position of at least one word portion in the text to improve the readability of the text by performing at least one of the following steps:
(A) compressing a first line of text so the first word of the following line of text moves to the end of the first line of text;
(B) expanding the first line of text so the last word of the first line of text moves to the beginning of the following line of text.

11. A method for improving the readability of text comprising a plurality of words in a plurality of lines, the method comprising the steps of:
analyzing the words in at least two lines of text; determining whether at least one readability problem is present in the at least two lines of text by performing the steps of:
(A) determining whether a sentence makes sense grammatically when one of the lines of text is removed;
(B) determining whether two adjacent lines begin with the same word;
(C) determining whether two adjacent lines end with the same word;
(D) determining whether two adjacent lines begin with the same part of speech;
(E) determining whether two adjacent lines end with the same part of speech; and
(F) determining whether two adjacent lines each have a last word that ends a sentences;
changing the line position of at least one word portion in the text to improve the readability of the text by performing at least one of the following steps:
(A) compressing a first line of text so the first word of the following line of text moves to the end of the first line of text;
(B) expanding the first line of text so the last word of the first line of text moves to the beginning of the following line of text.

12. A method for improving the readability of text comprising a plurality of words in a plurality of lines, the method comprising the steps of:
(A) analyzing the words in at least two lines of text;
(B) determining whether a sentence makes sense grammatically when one of the lines of text is removed;
(C) determining whether any two adjacent lines begin with the same word;
(D) determining whether any two adjacent lines end with the same word;
(E) determining whether any two adjacent lines begin with the same part of speech;
(F) determining whether any two adjacent lines end with the same part of speech;
(G) determining whether any two adjacent lines each have a last word that ends a sentence;
(H) changing the line position of at least one word portion in the text to eliminate at least one of the conditions identified in steps (B) through (G) from the text by performing at least one of the following steps:
(1) compressing a first line of text so the first word of the following line of text moves to the end of the first line of text;
(2) expanding a first line of text so the last word of the first line of text moves to the beginning of the following line of text.

13. A program product comprising:
a word positioning processor that analyzes the words in at least two lines of text, determines whether at least one readability problem is present in the at least two lines of text, wherein the at least one readability problem includes two adjacent lines that begin with the same word, the word positioning processor changing the line position of at least one word portion in the text to improve the readability of the text by performing at least one of the following steps:
(A) compressing a first line of text so the first word of the following line of text moves to the end of the first line of text;
(B) expanding the first line of text so the last word of the first line of text moves to the beginning of the following line of text; and
computer-readable signal bearing media bearing the word positioning processor.

14. The program product of claim 13 wherein the computer-readable signal bearing media comprises recordable media.

15. The program product of claim 13 wherein the computer-readable signal bearing media comprises transmission media.

16. A program product comprising:
a word positioning processor that analyzes the words in at least two lines of text, determines whether at least one readability problem is present in the at least two lines of text, wherein the at least one readability problem includes two adjacent lines that end with the same word, the word positioning processor changing the line position of at least one word portion in the text to improve the readability of the text by performing at least one of the following steps:
- (A) compressing a first line of text so the first word of the following line of text moves to the end of the first line of text;
- (B) expanding the first line of text so the last word of the first line of text moves to the beginning of the following line of text; and computer-readable signal bearing media bearing the word positioning processor.

17. The program product of claim 16 wherein the computer-readable signal bearing media comprises recordable media.

18. The program product of claim 16 wherein the computer-readable signal bearing media comprises transmission media.

19. A program product comprising:

a word positioning processor that analyzes the words in at least two lines of text, determines whether at least one readability problem is present in the at least two lines of text, wherein the at least one readability problem includes two adjacent lines that begin with the same part of speech, the word positioning processor changing the line position of at least one word portion in the text to improve the readability of the text by performing at least one of the following steps:
- (A) compressing a first line of text so the first word of the following line of text moves to the end of the first line of text;
- (B) expanding the first line of text so the last word of the first line of text moves to the beginning of the following line of text; and computer-readable signal bearing media bearing the word positioning processor.

20. (New) The program product of claim 19 wherein the computer-readable signal bearing media comprises recordable media.

21. (New) The program product of claim 19 wherein the computer-readable signal bearing media comprises transmission media.

22. A program product comprising:

a word positioning processor that analyzes the words in at least two lines of text, determines whether at least one readability problem is present in the at least two lines of text, wherein the at least one readability problem includes two adjacent lines that end with the same part of speech, the word positioning processor changing the line position of at least one word portion in the text to improve the readability of the text by performing at least one of the following steps:
- (A) compressing a first line of text so the first word of the following line of text moves to the end of the first line of text;
- (B) expanding the first line of text so the last word of the first line of text moves to the beginning of the following line of text; and computer-readable signal bearing media bearing the word positioning processor.

23. The program product of claim 22 wherein the computer-readable signal bearing media comprises recordable media.

24. The program product of claim 22 wherein the computer-readable signal bearing media comprises transmission media.

25. A program product comprising:

a word positioning processor that analyzes the words in at least two lines of text, determines whether at least one readability problem is present in the at least two lines of text, wherein the at least one readability problem includes two adjacent lines that each have a last word that ends a sentence, the word positioning processor changing the line position of at least one word portion in the text to improve the readability of the text by performing at least one of the following steps:
- (A) compressing a first line of text so the first word of the following line of text moves to the end of the first line of text;
- (B) expanding the first line of text so the last word of the first line of text moves to the beginning of the following line of text; and computer-readable signal bearing media bearing the word positioning processor.

26. The program product of claim 25 wherein the computer-readable signal bearing media comprises recordable media.

27. The program product of claim 25 wherein the computer-readable signal bearing media comprises transmission media.

* * * * *